United States Patent
Wawrzeniak et al.

(10) Patent No.: US 7,456,354 B1
(45) Date of Patent: Nov. 25, 2008

(54) POLE WITH KNOCK-OUTS

(75) Inventors: John H. Wawrzeniak, Arlington, TX (US); Tony Schuler, Hominy, OK (US); Allan D. Abney, Cypress, TX (US)

(73) Assignee: Valmont Industries Inc, Omaha, NE (US)

( * ) Notice: Subject to any disclaimer, the term of this patent is extended or adjusted under 35 U.S.C. 154(b) by 313 days.

(21) Appl. No.: 11/462,818

(22) Filed: Aug. 7, 2006

Related U.S. Application Data

(60) Provisional application No. 60/706,683, filed on Aug. 9, 2005.

(51) Int. Cl.
*H02G 7/20* (2006.01)

(52) U.S. Cl. .................. 174/45 R; 174/3; 174/40 R; 52/101

(58) Field of Classification Search .......... 174/2, 174/3, 40 R, 41, 45 R, 43, 137 R; 52/101, 52/291, 40, 146, 153, 292; 362/431; 343/890; 191/32
See application file for complete search history.

(56) References Cited

U.S. PATENT DOCUMENTS

| | | | |
|---|---|---|---|
| 832,509 A | 10/1906 | Slocum | |
| 1,264,450 A | 4/1918 | Sweet | |
| 1,709,187 A | 4/1929 | Newman et al. | |
| 1,944,706 A | 1/1934 | Calderwood | |
| 3,543,457 A | 12/1970 | Budlong | |
| 3,770,873 A | 11/1973 | Brown | |
| 3,873,759 A | 3/1975 | Schindler et al. | |
| 4,005,253 A | 1/1977 | Walter | |
| 4,007,852 A | 2/1977 | Gernhardt | |
| 4,373,111 A | 2/1983 | Myers et al. | |
| 4,434,120 A | 2/1984 | Aloisio, Jr. et al. | |
| 4,902,852 A | 2/1990 | Wuertz | |
| 4,914,258 A * | 4/1990 | Jackson | 174/45 R |
| 5,266,738 A | 11/1993 | MacVoy | |
| 5,975,727 A | 11/1999 | Morstein et al. | |
| 6,204,446 B1 * | 3/2001 | Parduhn | 174/45 R |
| 6,302,564 B1 | 10/2001 | Wedell et al. | |
| 6,399,881 B2 * | 6/2002 | Edelstein | 174/45 R |
| 6,484,982 B1 | 11/2002 | Barry et al. | |
| 6,595,323 B2 | 7/2003 | Lindsey et al. | |
| 7,059,096 B2 * | 6/2006 | Kuebler et al. | 52/838 |

* cited by examiner

*Primary Examiner*—Dhiru R Patel
(74) *Attorney, Agent, or Firm*—Camoriano and Associates; Theresa Fritz Camoriano

(57) ABSTRACT

A pole with knock-outs allows for quick, easy and versatile installation of hardware to the pole.

19 Claims, 4 Drawing Sheets

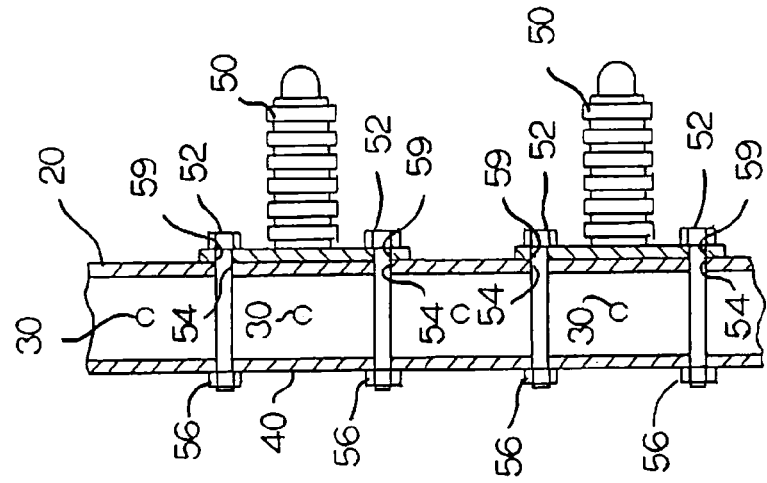
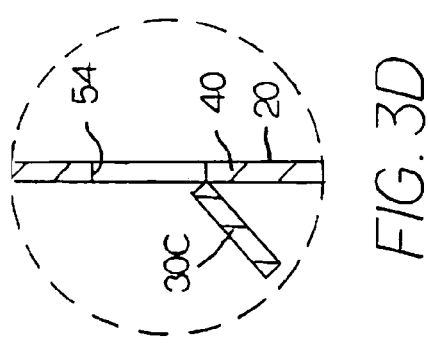
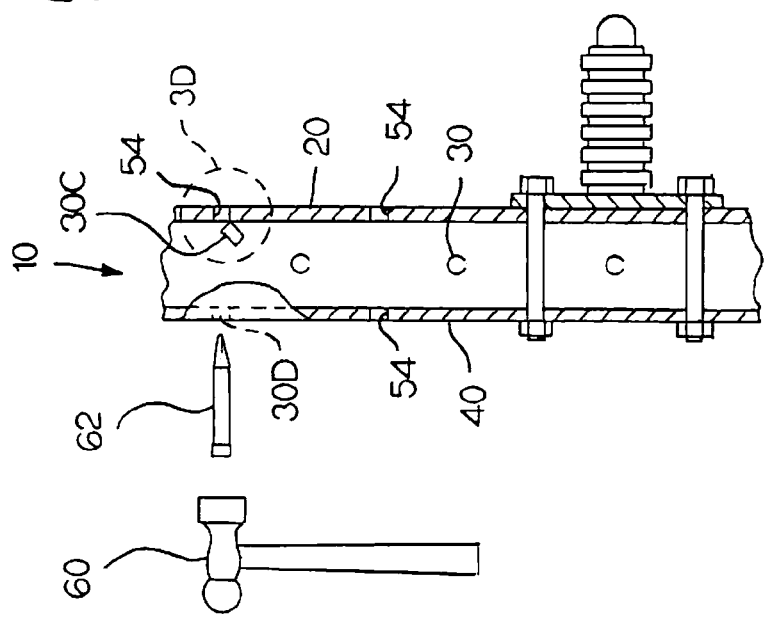

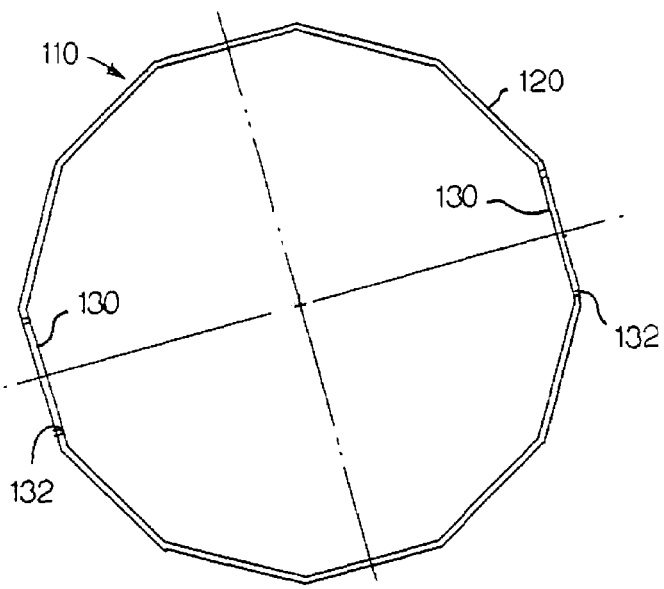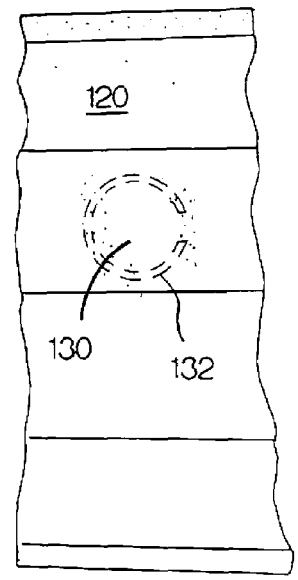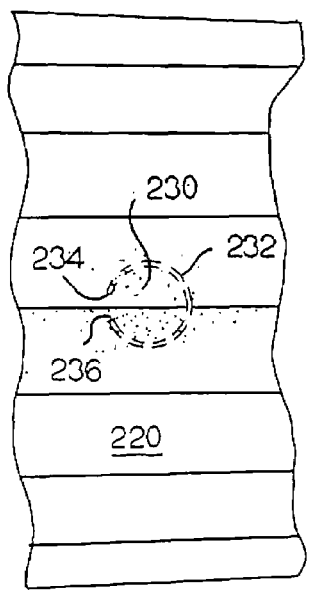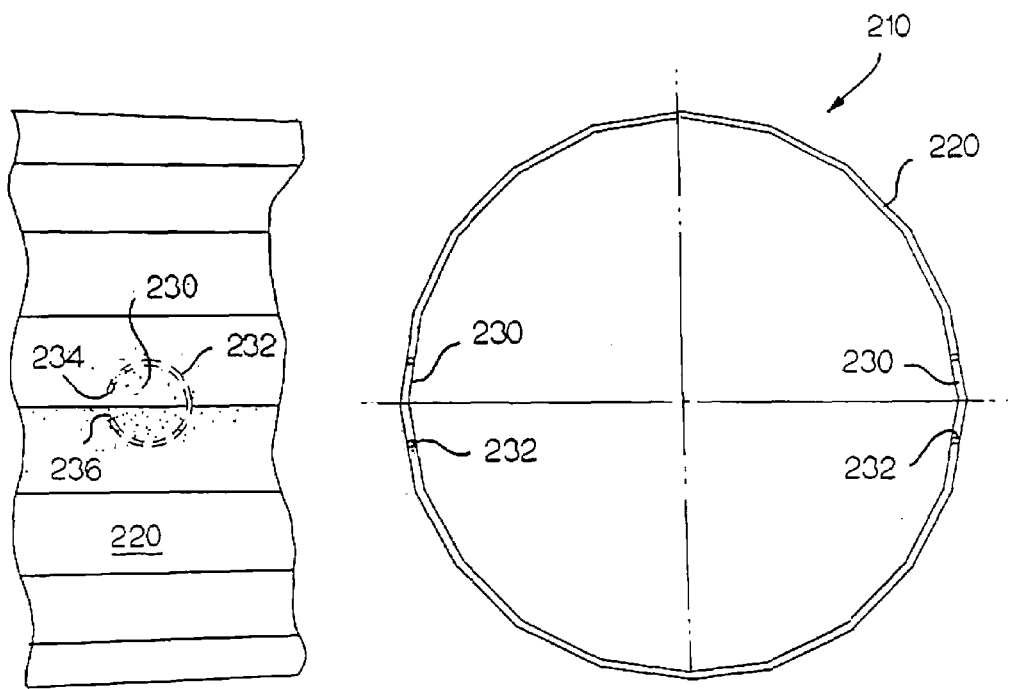
FIG. 4
FIG. 5
FIG. 7
FIG. 6

US 7,456,354 B1

POLE WITH KNOCK-OUTS

This application claims priority from U.S. Provisional Application Ser. No. 60/706,683, filed on Aug. 9, 2005, which is hereby incorporated by reference.

BACKGROUND

The present invention relates to poles. Poles generally have hardware mounted to them. For example, telephone poles and electrical transmission poles have horizontal arms or brackets extending from the pole to support telephone or electrical wires. Other poles, such as communication poles or lighting poles, have other hardware mounted to them. Generally, the hardware is attached through holes drilled into the pole.

Currently, poles are becoming increasingly standardized. The same pole may be used for a variety of applications, but each application requires holes in a different configuration. In order to accommodate all the applications, generally either the holes are drilled at the installation site after determining the desired location for the holes, or the pole is manufactured at the factory with numerous holes. Drilling the holes at the installation site can be time consuming and usually requires a heavy duty drilling device, such as a Rotabroach® cutter. Using a pole with a number of pre-installed holes is problematic because it is visually unappealing and may be noisy. In particular, the holes may create a whistling sound on windy days.

SUMMARY

The embodiments of poles shown and described herein are equipped with knock-outs. Knock-outs eliminate the need to drill holes at the installation site, and they do not have the aesthetics and noise problems associated with numerous holes. The same pole can be used for different hardware, and the pole can be quickly and easily configured for the hardware at the installation site.

BRIEF DESCRIPTION OF THE DRAWINGS

FIG. 3B is a broken away side sectional view of the pole of FIG. 1 in an intermediate stage of mounting a piece of hardware to the pole;

FIG. 3C is a broken away side sectional view of the pole of FIG. 1 in a final stage of mounting a piece of hardware to the pole;

FIG. 3D is an enlarged view of the portion labeled 3D in FIG. 3B,

FIG. 4 is a cross-sectional view of another embodiment of a pole with knock-outs made in accordance with the present invention;

FIG. 5 is a close-up view of a knock-out found on the pole of FIG. 4;

FIG. 6 is a cross-sectional view of another embodiment of a pole with knock-outs made in accordance with the present invention; and FIG. 7 is a close-up view of a knock-out found on the pole of FIG. 6.

DETAILED DESCRIPTION

Figure 1:
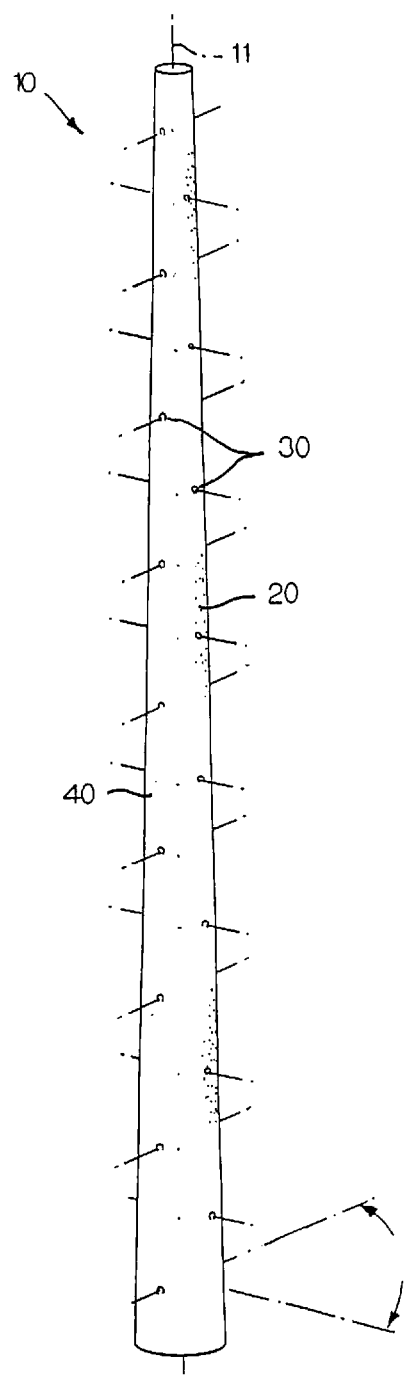
FIG. 1 is a perspective view of a pole with knock-outs made in accordance with the present invention.
Figure 2:
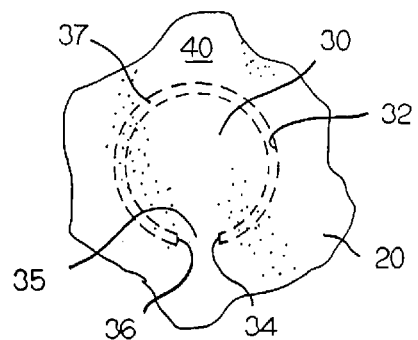
FIG. 2 is a close-up view of one of the knock-outs on the pole of FIG. 1.
Figure 3:
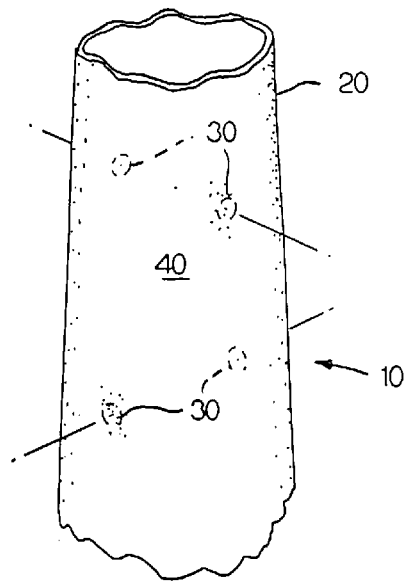
FIG. 3 is a broken away perspective view of the pole of FIG. 1.

FIGS. 1, 2 and 3 show one embodiment of a pole 10 made in accordance with the present invention. As best shown in FIG. 1, the pole 10 is elongated vertically, defines a central vertical axis 11, and has a circular cross section which tapers from a larger diameter at the bottom to a smaller diameter at the top. In other embodiments, the pole may be straight instead of tapered. The pole 10 is hollow and has an outer casing 20 made of a rigid material. In this embodiment, the outer casing 20 is made of steel, but it may be constructed of a variety of other rigid materials including but not limited to aluminum and fiberglass. In order to provide sufficient structural support, the outer casing 20 typically is relatively thick—in the range of 0.125-1.0 inches. The pole 10 has knock-outs 30 formed in the outer casing 20. In this embodiment, the knock-outs 30 are configured in opposed pairs at different elevations, with each pair lying along a straight line and with adjacent pairs alternating by 90 degrees (as denoted by the arrow A in FIG. 1), however, various other configurations are possible.

FIG. 2 is a close-up view of one of the knock-outs 30 of this embodiment. The knock-out 30 is formed by cutting a slot 32 into the outer casing 20. The slot 32 is typically cut using a thermal torch, such as a plasma cutter, but it may also be cut by other means including, but not limited to, a laser cutter and a water jet cutter. The cutter may be manually controlled or controlled by a computer (i.e. CNC). The slot 32 extends completely through the outer casing 20 and defines the periphery of the knock-out 30. The slot 32 in this embodiment has a first end 34 and a second end 36, and the knock-out 30 was formed by cutting through the outer casing 20 in a continuous motion from the first end 34 to the second end 36. In this case, the slot 32 has a circular shape, but the knock-out could have other shapes, such as oval or polygonal, if desired. The slot 32 is cut such that the first and second ends 34, 36 of the slot 32 are near each other, but there is still a connection 35 in between the ends 34, 36 to connect the knock-out 30 to the main body 40 of the outer casing 20 and hold the knock-out 30 in place. The ends 34, 36 of the slot are close enough to each other that the connection 35 between the two ends 34, 36 bends or breaks when the knock-out 30 is struck with a suitable removal instrument, such as a hammer and a punch. In this embodiment, the slot 32 encompasses 330-355 degrees of a circle, leaving 5-30 degrees remaining between the ends 34, 36 for the connection 35 between the knock-out 30 and the main body 40 of the casing 20.

Figure 2A:
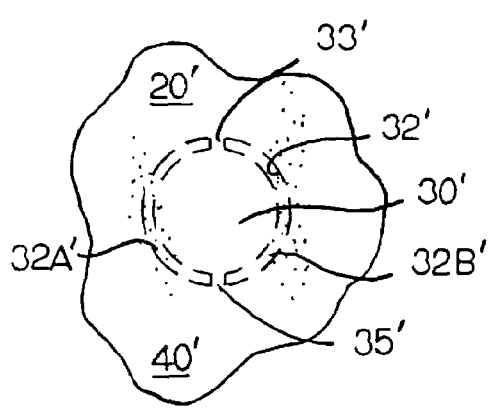
FIG. 2A is a close-up view of another embodiment of a knock-out for a pole made in accordance with the present invention.

FIG. 2A shows another embodiment of a slot 32' defining the periphery of a knock-out portion 30', wherein the knock-out 30' is connected to the main body 40' of the outer casing 20' in more than one spot. Here, the slot 32' includes a left half 32A' and a right half 32B' with top and bottom connections 33', 35' separating the halves 32A', 32B' and connecting the knock-out 30' to the main body 40'. The left half 32A' and right half 32B' of the slot 32' are positioned close enough to each other that the top and bottom connections 33', 35' will break when the knock-out is struck with a suitable instrument, such as a hammer and punch. Of course, other configurations that connect the knock-out to the main body may also be used.

The slots 32 are cut into the pole 10 during the manufacturing process. In a typical pole manufacturing process, an elongated sheet of rigid material is bent into a tubular shape (which may be round or multi-sided), and then the elongated edges of the original sheet are welded together to form the outer casing of the pole. The slots 32 that define the knock-outs 30 may be cut into the flat sheet of rigid material before it is bent into a tubular shape, or the slots 32 may be cut into the outer casing of the pole (i.e. after the sheet is bent). After the slots are cut into the pole, the pole is galvanized or otherwise coated.

When the slots 32 are being cut, the slot width is controlled to a specific maximum dimension to ensure that the slots 32 are substantially filled during the subsequent coating process. In this embodiment, the slots 32 are not wider than 0.0625 inches. It is even more preferred that the slots be less than 0.03 inches in width. In the galvanization process, the outer casing 20 of the pole 10 is coated with zinc and the slots 32 are substantially filled with the coating 37 (as shown in FIG. 2). Since the coating 37 is typically applied uniformly to the pole 10, the coating 37 is generally indented slightly where the slots 32 are located. The indentations allow the knock-outs 30 to be seen up-close, so that field personnel can punch and detach the knock-outs 30 in the specific locations that are desired. At the same time, the knock-out locations are practically undetectable from a short distance because the slots 32 are substantially filled. Of course, other coatings, such as paint, may be applied to the pole in addition to or instead of the galvanization coating. Whether a single coating or multiple coatings are applied, the slots are substantially filled. Substantially filling the slots with a coating also alleviates noise concerns, since there are no significant open areas through which the wind can blow, and it alleviates other leaks through the knock-outs as well.

Occasionally, after the coating process, there may be one or more points where the coating failed to completely bridge the slot width. Instances where the coating fails to bridge the slot width are infrequent and random, and such instances are not significant enough to affect the aesthetic appearance of the pole or cause noise concerns. Further, even though the coating may fail to bridge the slot width in some areas, the slots as a whole are substantially filled by the coating or coatings.

FIG. 3 shows an enlarged portion of the pole 10, highlighting the configuration of the knock-outs 30 in this particular embodiment. In this case, the knock-outs 30 are arranged in horizontal rows. Each row includes two opposed knock-outs 30 lying along a diameter of the pole 10, and each row is staggered 90 degrees from the row directly above and below it. The vertical spacing between each adjacent pair of rows is the same. This configuration allows a bolt or other connector to pass through the center of the pole if a row of knock-outs is knocked out, as All be explained in more detail later. Of course, the knock-outs do not have to be arranged in opposed pairs, nor do they have to be regularly spaced apart vertically. They can be arranged in any desired configuration.

Figure 3A:
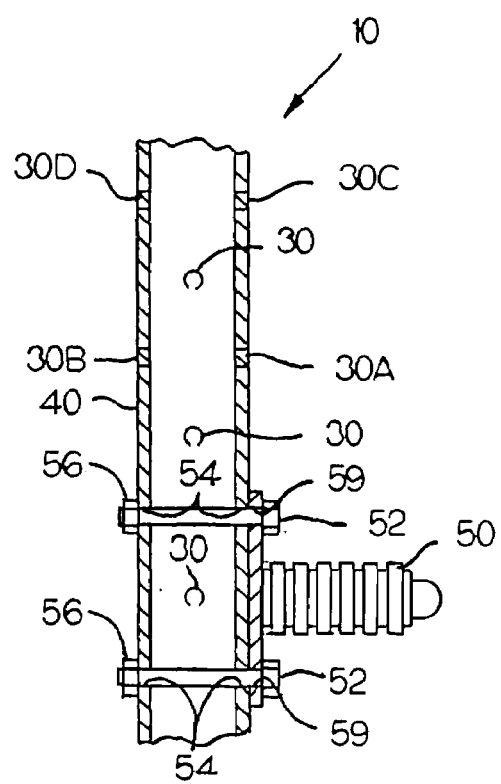
FIG. 3A is a broken away side sectional view of the pole of FIG. 1 in a preliminary stage of mounting a piece of hardware to the pole.

FIG. 3A is a side sectional view of the pole 10, but with an electrical wire support bracket 50 mounted on the pole 10. The bracket 50 is attached to the pole 10 with bolts 52 that extend through mounting holes 59 in the bracket and through opposed holes 54 in the pole 10. Nuts 56 are threaded onto the bolts 52 to secure the bracket 50 against the main body 40 of the outer casing 20. The holes 54 were created by removing knock-outs 30 at the desired locations according to the procedure for mounting hardware that is outlined below. Using a pole with knock-outs allows for quick, easy and versatile installation of hardware. The hardware can be attached after the pole is installed in the ground, and the installer does not need specialized tools or equipment.

Installation Procedure:

FIG. 3A shows the pole 10 with one bracket 50 already installed and prior to installing another bracket 50. The first step in the installation process is determining the elevation of the pole 10 at which the second bracket is to be installed. In this case, it is desired to install the second electrical wire support bracket 50 (shown installed in FIG. 3C) above the existing bracket 50 and on the same side of the pole 10 as the existing bracket 50. The next step is to remove the knock-outs 30 which correspond to the desired elevation, which in this case are the four knock-outs 30A, 30B, 30C, 30D directly above the existing bracket 50 shown in FIG. 3A.

FIG. 3B is a view of the pole 10 during an intermediate stage of installation. Three of the knock-outs 30A, 30B, 30C have been removed, leaving holes 54 where the knock-outs had been. Two knock-outs 30A, 30B have been completely removed, and one knock-out 30C has been bent inwardly and is still hanging by the connection between the knock-out 30C and the main body 40 of the outer casing 20. In most instances, the knock-out is completely removed rather than being left hanging. FIG. 3D provides an enlarged view of the hanging knock-out 30C. Even though the hanging knock-out is not completely detached from the main body 40 of the outer casing 20, it is still considered to have been removed, because it has been removed sufficiently to form a hole 54 that can receive a connector, bolt or other piece of equipment for mounting hardware. The fourth knock-out 30D is still in place, but it is about to be removed by being struck with the combination of a hammer 60 and punch 62.

FIG. 3C is a view of the pole 10 after the installation of the second electrical wire support bracket 50 is complete. To complete the installation, bolts 52 were inserted through mounting holes 59 in the bracket 50 and through the pairs of opposed holes 54 in the outer casing 20 (which were created by removing the knock-outs 30 in the previous step). In addition, nuts 56 were threaded onto the bolts 52 to tighten the bracket 50 against the outer casing 20 of the pole 10. The remaining knock-outs 30 may be used at a later time to mount additional hardware.

FIGS. 4 and 5 are views of an alternate embodiment of a pole 110 made in accordance with the present invention. While the first embodiment had a circular cross-section, this pole 110 has a cross-section in the shape of a dodecagon (i.e. a regular, 12 sided polygon). Again, the knock-outs 130 are situated in pairs 180 degrees apart from each other to facilitate easy installation of hardware using bolts or other connectors. While in the first embodiment the knock-outs were formed in a curved wall, in this case, each of the knock-outs 130 is formed by a slot 132 cut into one of the flat surfaces of the outer casing 120, as best shown in FIG. 5.

FIGS. 6 and 7 show yet another embodiment of a pole 210 made in accordance with the present invention. In this case, the cross-sectional shape of the pole is an icosagon (i.e. a regular 20 sided polygon), and each knock-out 230 spans two adjacent flat surfaces of the outer casing 220, as best shown in FIG. 7. The periphery of each knock-out 230 is defined by a slot 232 having a first end 234 and a second end 236. The first end 234 of the slot 232 is on one flat side of the icosagon and the second end 236 is on another, adjacent flat side. It is also possible to have a knock-out where both ends are on the same side of the pole, or where the knock-out spans more than two sides.

It will be obvious to those skilled in the art that modifications may be made to the embodiments described above without departing from the scope of the present invention.

What is claimed is:

1. A pole, comprising:
    an elongated outer casing including a main body and defining a plurality of slots in said outer casing, each slot defining the periphery of a detachable knock-out portion of said outer casing, wherein each slot leaves some connection between said detachable knock-out portion and said main body; and
    a coating covering said outer casing and substantially filling said slots.

2. A pole, as recited in claim 1, wherein at least one of said slots is arcuate, defining the periphery of a circular detachable knock-out portion, and said arcuate slot encompasses 330 to 355 degrees.

3. A pole, as recited in claim 1, wherein said pole has a polygonal cross-section comprising a plurality of flat side surfaces, and at least one of said slots extends into at least two adjacent of said flat side surfaces of said pole.

4. A pole, as recited in claim 1, wherein said outer casing is at least 0.125 inches thick.

5. A pole, as recited in claim 1, wherein said knock-out portions are aligned on said outer casing in opposed pairs 180 degrees apart.

6. A pole, as recited in claim 5, wherein said opposed pairs of said knock-out portions are spaced apart vertically and said vertically spaced apart opposed pairs are staggered 90 degrees apart from each other.

7. A method of forming a pole, comprising the steps of: providing an elongated sheet of rigid material, wherein said rigid material is at least 0.1 inches thick; bending said elongated sheet of rigid material into a tubular shape; cutting a plurality of slots in said rigid material, wherein each of said slots forms a generally circular arc spanning at least 330 degrees to define a knock-out portion and a main body, leaving some connection between the knockout portion and the main body; and coating said rigid material, wherein said coating substantially fills said slots.

8. A method of forming a pole as recited in claim 7, wherein said rigid material is steel and said cutting is performed with a plasma cutter.

9. A method of forming a pole as recited in claim 8, wherein said plasma cutter is computer controlled.

10. A method of forming a pole as recited in claim 7, wherein said slots are cut into said rigid material before said rigid material is bent into said tubular shape.

11. A method of forming a pole as recited in claim 7, wherein said slots are cut into said rigid material after said rigid material is bent into said tubular shape.

12. A method of forming a pole as recited in claim 7, wherein said tubular shape has a circular cross-section.

13. A method of forming a pole as recited in claim 7, wherein said tubular shape has a polygonal cross-section.

14. A method of forming a pole as recited in claim 7, wherein each slot has a first end and a second end and each slot is cut by starting at said first end and finishing at said second end.

15. A method of mounting hardware on a pole, comprising the steps of: manufacturing a pole including an outer casing defining a plurality of slots, each slot defining the periphery of a detachable knock-out and leaving a connection between the knockout and the outer casing, said knock-outs located at a plurality of elevations of said pole; determining the elevation of said pole at which a piece of hardware is desired; removing at least one of said knock-outs corresponding to the desired elevation of said pole to form a hole through said outer casing; and mounting said piece of hardware using said hole.

16. A method of mounting hardware on a pole as recited in claim 15, and further comprising the step of coating said pole and substantially filling said slots with the coating.

17. A method of mounting hardware on a pole as recited in claim 15, wherein the removal of said at least one of said knock-outs is achieved by applying a sudden force, as with a hammer, to said knock-out.

18. A method of mounting hardware on a pole as recited in claim 15, wherein said knock-outs are aligned on said outer casing in opposed pairs 180 degrees apart, and including the steps of removing a pair of said knock-outs leaving a pair of opposed holes 180 degrees apart in said outer casing, and extending a connector through said piece of hardware and through said opposed holes.

19. A method of mounting hardware on a pole as recited in claim 15, and further comprising the step of installing said pole into the ground before removing said knock-outs.

* * * * *